United States Patent [19]

Vollaro

[11] Patent Number: 5,131,611
[45] Date of Patent: Jul. 21, 1992

[54] METHOD AND APPARATUS FOR REACTIONLESS ROTATION

[75] Inventor: Joseph F. Vollaro, Pleasantville, N.Y.

[73] Assignee: The Perkin-Elmer Corporation, Norwalk, Conn.

[21] Appl. No.: 691,936

[22] Filed: Apr. 26, 1991

[51] Int. Cl.⁵ .................. B64G 1/64; F16M 13/00
[52] U.S. Cl. .................... 244/158 R; 248/550; 343/DIG. 2
[58] Field of Search .......... 244/118.1, 137.1, 158 RX, 244/173; 248/550 X; 343/DIG. 2; 89/1.816, 1.819

[56] References Cited

U.S. PATENT DOCUMENTS

| | | | |
|---|---|---|---|
| 3,208,707 | 9/1965 | Blumrich | 267/113 |
| 3,814,350 | 6/1974 | Fletcher et al. | 244/158 R |
| 4,324,374 | 4/1982 | Wittman et al. | 244/158 R |
| 4,355,775 | 10/1982 | Ganssle | 244/158 R |
| 4,359,201 | 11/1982 | Thomson et al. | 244/158 R |
| 4,375,878 | 5/1983 | Harvey et al. | 248/550 |
| 4,452,124 | 6/1984 | Morenus et al. | 99/1.816 |
| 4,582,291 | 4/1986 | Mathews | 248/550 |
| 4,618,111 | 10/1986 | Sherwood et al. | 244/158 R |
| 4,646,994 | 3/1987 | Petersen et al. | 244/137.1 |

Primary Examiner—Joseph F. Peters, Jr.
Assistant Examiner—Vitna Lissi Mojica
Attorney, Agent, or Firm—H. S. Ingham; E. T. Grimes

[57] ABSTRACT

An object mounted on a carrier constitute a rotationally free system such as a telescope on a space vehicle. A separation vector is directed from the center-of-mass of the carrier to the center-of-mass of the object. The object is rotated through a selected angle thereby defining a rotation vector. Simultaneously the object is translated so as to displace the object center-of-mass through a translation distance in a direction such that mathematically crossing the translation vector into the separation vector results in a further vector having the same direction as the rotation vector. A formula is provided for the translation distance in order that the object may be rotated without counter-rotation of the carrier.

14 Claims, 2 Drawing Sheets

METHOD AND APPARATUS FOR REACTIONLESS ROTATION

This invention relates to rotation, and particularly to reactionless rotation of an object on a rotationally-free carrier such as a space vehicle.

BACKGROUND OF THE INVENTION

It is often necessary to change the position of a payload carried aboard a spacecraft, for example to alter the pointing direction of a telescope. To do so, torque is applied to the payload and a corresponding reaction torque is thereby applied to the vehicle. The result is the desired motion of the payload accompanied by undesired motion of the vehicle. If vehicle motion is unacceptable, an attitude control system (ACS) on the vehicle must act to control it, generally requiring use of electrical power and/or propellant. If the ACS cannot accept the burden, then the payload must be designed to be reactionless. This usually is accomplished with a countermoving mass to absorb the reaction torque so that the net torque on the vehicle is essentially zero. This method, however, significantly increases the weight of the system.

SUMMARY OF THE INVENTION

Therefore, objectives of the invention are to provide a novel method and apparatus for rotating an object on a carrier in a rotationally free system, such as a payload on a space vehicle, so that the object is rotated without the carrier being counter-rotated.

The foregoing and other objectives are achieved by a method for rotating an object pivotally supported on a carriage mounted on a carrier. The carrier, the carriage and the object constitute a rotationally free system. The carrier has a mass M and a carrier center-of-mass, and the object has a moment of inertia I about an object center-of-mass. The object and the carriage constitute a subsystem having a mass m and a center-of-mass separated from the carrier center-of-mass by a separation vector having a length $L'$ directed from the carrier center-of-mass to the subsystem center-of-mass. The subsystem center-of-mass has an initial position on the carrier.

The method comprises rotating the object through a selected angle A about an axis through the object center-of-mass, angle A being defined by a rotation vector substantially perpendicular to the separation vector, and translating the subsystem so as to displace the subsystem center-of-mass in a translation vector through a translation distance D from the initial position in a translation direction such that mathematically crossing the translation vector into the separation vector results in a further vector having the same direction as the rotation vector. The distance D is such that the object is rotated through the selected angle without substantial counter-rotation of the carrier. The distance D is determined advantageously according to the formula $D = A*I*\{1/M+1/m\}/L$, where L is a component length of $L'$ in a direction perpendicular to the translation vector. The step of translating should be effected simultaneously with the step of rotating such that the carrier remains unrotated during the step of rotating the object.

The objectives are further achieved by an apparatus for rotating an object on a carrier. The apparatus comprises carriage means, mounted on the carrier, for pivotally supporting the object and translating the object relative to the carrier, wherein the carrier, the carriage and the object constitute a rotationally free system. The carrier has a mass M and a carrier center-of-mass, and the object has a moment of inertia I about an object center-of-mass. The object and the carriage constitute a subsystem having a mass m and a center-of-mass separated from the carrier center-of-mass by a separation vector having a length L directed from the carrier center-of-mass to the subsystem center-of-mass. The subsystem center-of-mass has an initial position on the carrier.

The apparatus further comprises rotating means for rotating the object through a selected angle A about an axis through the object center-of-mass, angle A being defined by a rotation vector substantially perpendicular to the separation vector, and translating means for translating the subsystem so as to displace the subsystem center-of-mass through a translation distance D from the initial position in a translation direction such that mathematically crossing the translation vector into the separation vector results in a further vector having the same direction as the rotation vector. The distance D is such that the object is rotated through the selected angle without substantial counter-rotation of the carrier. The distance D should be effected simultaneously with angle A, and is determined advantageously according to the formula $D = A*I*\{1/M+1/m\}/L$, where L is a component length of $L'$ in a direction perpendicular to the translation vector. The rotating means and the translating means constitute an actuating system for rotating and translating simultaneously, such that the carrier remains unrotated during the step of rotating the object.

DETAILED DESCRIPTION OF THE INVENTION

Figure 1:
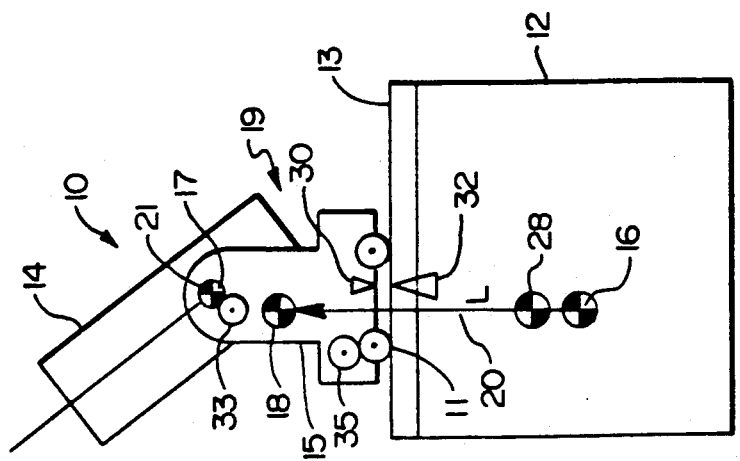
FIG. 1 is a schematic drawing of a system for carrying out the invention.

FIG. 1 schematically shows a rotationally-free system 10 for carrying out the present invention. A carrier 12 such as a space vehicle has positioned thereon an object 14 to be rotated, such as a telescope, antenna, or other payload. The object is pivotally supported on a carriage 15 on an axis 17 which passes through the center-of-mass 21 of the object 14. The carriage is mounted on the carrier 12, so that the carrier, the carriage and the object in combination constitute the rotationally free system. The carriage is positioned in a track system 13 which may include wheels 11 or a sliding system or an actuator or the like, to allow displacement of the carriage and object with respect to the carrier.

The carrier 12 has a mass M and a carrier center-of-mass 16, and the object 14 has a moment of inertia I about the object center-of-mass 21. The object 14 and the carriage 15 together constitute a subsystem 19 having a mass m. This subsystem has a center-of-mass 18 separated from the carrier center-of-mass 16 by a separation vector 20 with a length factor L. L is clarified below. This vector is directed from the carrier centerof-mass to the subsystem center-of-mass. (The term "vector" is used herein and in the claims in the conventional mathematical sense, having a length or other magnitude, and a direction. The direction of a rotation vector is defined by the right-hand rule.)

The subsystem center-of-mass 18 has an initial position (FIG. 1) relative to the carrier 12, as may be referenced by the initial separation vector 20. As a further reference for determining subsequent displacement of this center-of-mass, a reference point 30 on the carriage 15 is aligned initially with a reference point 32 on the carrier.

Figure 2:
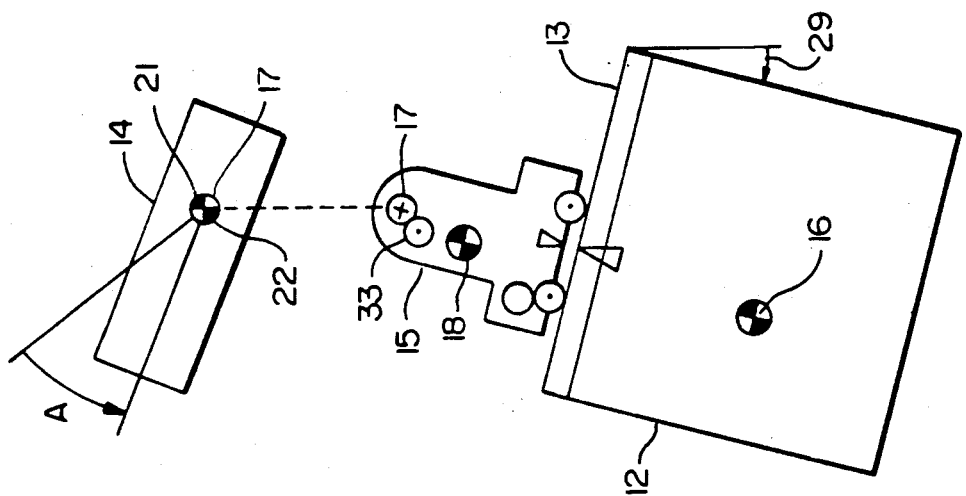
FIG. 2 shows components of FIG. 1 respectively rotated.

As indicated in FIG. 2, which shows the object 14 separated from the carriage 15 for clarity, the object may be rotated by a rotation means such as a drive motor 33 through a selected angle A, for example to realign a telescope which is the object. This rotation angle is effected in the spatial coordinate system although, as will become apparent, the angle is conveniently measured with respect to the carrier 12 when the steps according to the invention are completed. Since the rotation is effected within the rotationally-free system, the carrier 12 and the carriage 15 mounted thereon will have an opposite counter-rotation 29 as a reaction. The purpose of the invention is to prevent this counter-rotation.

As indicated above, the rotation A is effected about an axis 17 extending through the center-of-mass 21 of the object, perpendicular to the separation vector. A rotation vector 22 on the axis is defined by the right hand rule for the rotation A, e.g. vertically upwards from the plane of FIG. 2 for the counterclockwise rotation of the object. This rotation vector also is substantially perpendicular to the separation vector 20.

Figure 3:
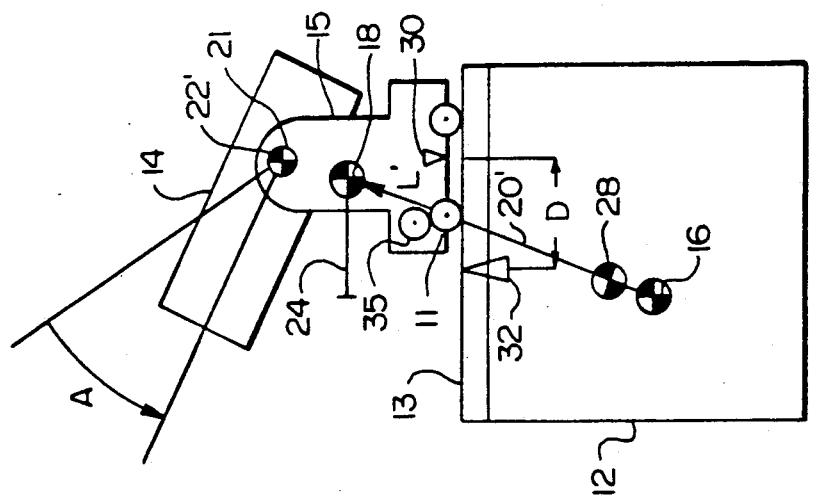
FIG. 3 shows the system of FIG. 1 after carrying out the invention.

In conjunction with the rotation, the subsystem 19 including the object 14 is translated (FIG. 3) so as to displace the subsystem center-of-mass 18, and correspondingly the object center of mass 21, through translation vector 24 with a translation distance D from the initial position with respect to the carrier. The translation means may be conventional as with a drive motor 35 to a wheel 11. Distance D is conveniently measured as a displacement of the point 30 from the point 32, as the movement of the carriage is effected along the track. The translation vector 24 is directed in a translation direction such that mathematically crossing the translation vector 24 into the separation vector 20 results in a further vector 22' having the same direction as the rotation vector 22. Thus the track system 13 for the carriage is established so as to allow the displacement perpendicularly to the rotation vector 22. The separation vector moves with point 18, to a final vector 20'. The distance D is such that the object is rotated through the selected angle without counter-rotation of the carrier. This distance may be determined empirically by moving the carriage sufficiently in the proper direction during the rotation to prevent counter-rotation. More accurately, or by automation, the distance D is determined according to the formula $D = A*I*\{1/M + 1/m\}/L$.

In applying this formula during the motions, it should be noted that A and D are functions of time. To cause the desired effect, proper torque and force are applied simultaneously to the object and carrier. These are applied according to the formula $F = T/L$ where F is the force applied to the subsystem and T is the torque simultaneously applied to the object. Also the step of translating should be effected simultaneously with the step of rotating so that the carrier remains unrotated during the step of rotating the object. The distance D may be effected simultaneously with angle A by implementation of the formula $X'' = A'' * \{I/(m*L)\}$ where $X''$ is the linear inertial acceleration of the subsystem and $A''$ is the simultaneous angular inertial acceleration of the object.

Reactionless rotation is thereby achieved. This result is accomplished without the extra weight normally required with a reactionless system. While this method results in zero net moment on the carrier, there is a net force acting at the center of mass 16 of the carrier 12. The further result is linear translation of the carrier with respect to the combined center of mass 28 of the system. However, there will be no effect on the combined center of mass or, therefore, on the trajectory or velocity if the system is a spacecraft.

As mentioned, the rotation vector should be substantially perpendicular to the separation vector. Any deviation from perpendicularly, or any other small variation from carrying out the invention exactly, may result in some counter-rotation of the carrier. This may be acceptable or, if not, should be small enough to be compensated by a conventional attitude control system. In such case, use of power or propellant will be much less than if relied upon completely.

The carriage 15 also may be considered to be effectively part of a translating means for translating the object in the manner described. The translating means may further be combined with the rotating means for rotating the object, into a combined actuating system. Also the carriage itself may have no significant mass in which case the subsystem center-of-mass 18 substantially coincides with the object center-of-mass 21 on the axis 17.

Figure 4:
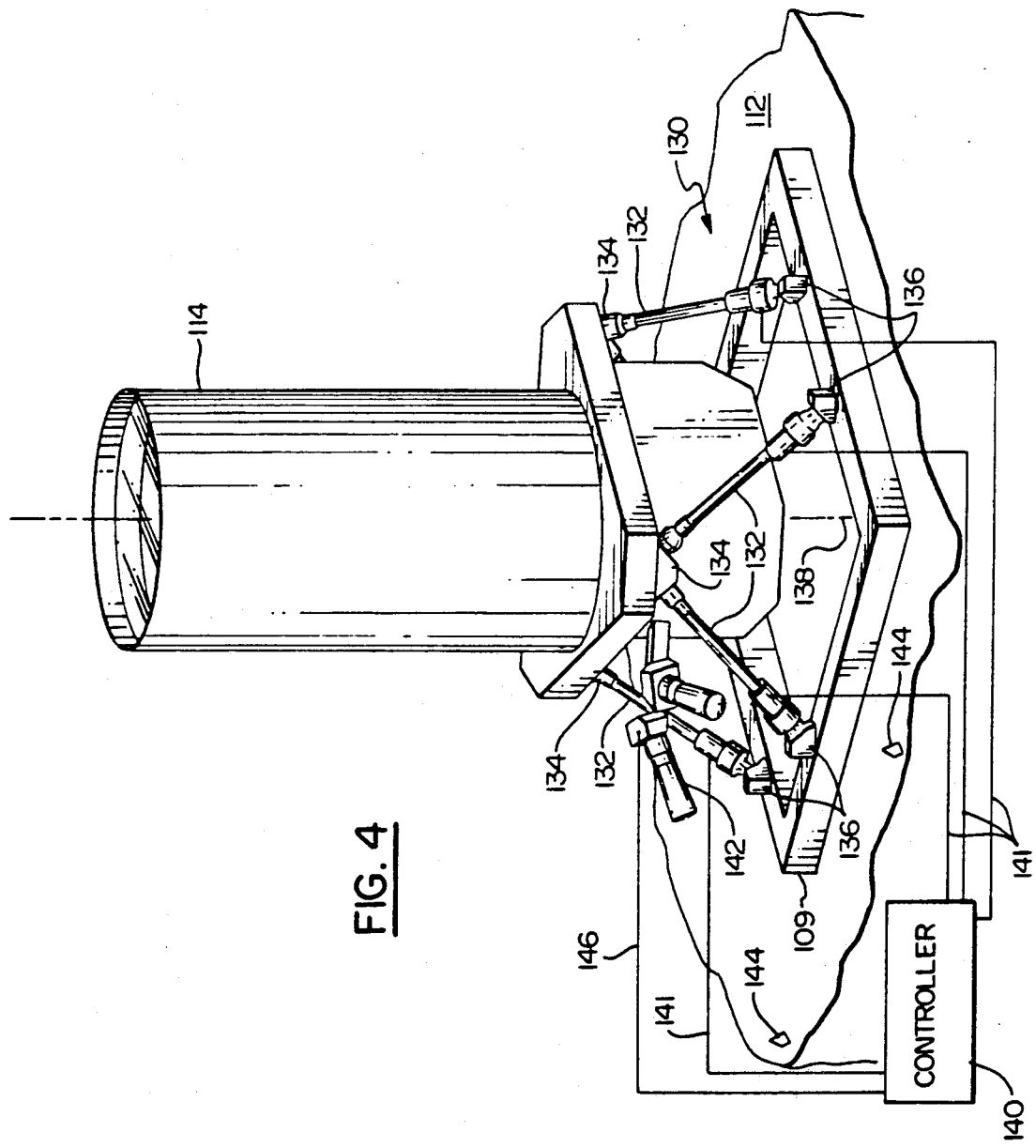
FIG. 4 is a perspective of a telescope on a space vehicle incorporating an apparatus of the invention.

FIG. 4 illustrates an object such as a space telescope 114 mounted on a pad 109 in a space vehicle (carrier) 112 with an actuating system 130. The actuating system effectively handles the functions of the rotating means and the translating means as well as the carriage means. The system 130 comprises three pairs of linear actuators 132 mounting the object to the carrier, arranged in the manner known in the art of object manipulations. Each pair has a common pivotal attachment 134 to the object with the pivotal attachments being arcuately spaced on the object.

The linear actuators of each pair are essentially orthogonal to each other with outer ends 136 pivotally connected to the carrier. The outer ends of all six linear actuators 132 are substantially equidistant from a central axis 138 of the object 114. This system allows full freedom of movements as required for the invention.

The actuating system further comprises a computerized control means 140 for driving via signals on lines 141 the linear actuators 132 cooperatively so as to rotate the object 114 by the angle A and displace the object by the distance D. A sensing system, such as a conventional optical triangulation system 142, senses position and orientation of the object relative to points 144 on the carrier and/or stars, and provides feedback via a line on the position and the orientation to the controller. Computations may be made with conventional programs utilized for attitude determination and control of space systems.

Operator or other input to the controller, and the responsive signal output to the actuators, effect rotation through the angle A. Program computations simultaneously modify the signals for effecting translation through the distance D in the proper direction. With standard programming the computer-controller converts the feedback information to commands to the linear actuators, using the formula for distance D, taking into account the vector directions. Thus this actuating system simultaneously provides the functions of a first actuating means for rotating the object by the selected angle, a second actuating means for displacing its center of mass by the compensating distance D, and a carriage means for supporting and moving the object.

Thus far the separation vector has been defined between the carrier center-of-mass and the subsystem center-of-mass. In the case illustrated in the figures, the separation vector is more accurately the initial separation vector 20 when the separation vector is perpendicular to the track and thereby to the translation vector 24. After translation (FIG. 3) these are not perpendicular and the new separation vector 20' has a longer length L'. More generally these vectors 20' and 24 do not need to be perpendicular. For the purpose of the formula for D, L is the component length of the separation vector length L' in a direction perpendicular to the translation vector.

As indicated, the invention is particularly suitable for rotating an object on a space vehicle in a weightless environment. However, the invention also may be applied to a carrier-object system suitably suspended on earth, e.g. for the above-described rotation and translation to be effected in a horizontal plane.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A method for rotating an object mounted on a carrier, wherein the carrier and the object constitute a rotationally free system and have respective centers of mass separated by a separation vector directed from the carrier center-of-mass to the object center-of-mass, comprising rotating the object through a selected angle defined by a rotation vector with a vector direction substantially perpendicular to the separation vector, and translating the object so as to displace the object center-of-mass in a translation vector having a translation distance and a translation direction such that mathematically crossing the translation vector into the separation vector results in a further vector having the vector direction of the rotation vector, the translation distance being such that the object is rotated through the selected angle without a substantial counter-rotation of the carrier.

2. The method according to claim 1 wherein the step of translating is effected simultaneously with the step of rotating such that the carrier remains substantially unrotated during the step of rotating.

3. The method according to claim 1 wherein the rotationally free system is an unsupported system in a weightless environment.

4. The method according to claim 3 wherein the carrier is a space vehicle.

5. The method according to claim 4 wherein the object is a telescope or an antenna.

6. A method for rotating an object pivotally supported on a carriage mounted on a carrier, wherein the carrier, the carriage and the object constitute a rotationally free system, the carrier has a mass M and a carrier center-of-mass, the object has a moment of inertia I about an object center-of-mass, the object and the carriage constitute a subsystem having a mass m and a center-of-mass separated from the carrier center-of-mass by a separation vector having a length L' directed from the carrier center-of-mass to the subsystem center-of-mass, and the subsystem center-of-mass has an initial position on the carrier, the method comprising:

rotating the object through a selected angle A about an axis through the object center-of-mass, the selected angle A being defined by a rotation vector with a vector direction substantially perpendicular to the separation vector, and simultaneously translating the subsystem so as to displace the subsystem center-of-mass in a translation vector having a translation distance D from the initial position and a translation direction such that mathematically crossing the translation vector into the separation vector results in a further vector having the vector direction of the rotation vector, the translation distance D being determined according to the formula $D = A*I*\{1/M + 1/m\}/L$, where L is a component length of L' in a direction perpendicular to the translation vector, whereby the object is rotated through the selected angle without a substantial counter-rotation of the carrier.

7. An apparatus for rotating an object mounted on a carrier, wherein the carrier and the object constitute a rotationally free system and have respective centers of mass separated by a separation vector directed from the carrier center-of-mass to the object center-of-mass, comprising rotating means for rotating the object through a selected angle defined by a rotation vector with a vector direction substantially perpendicular to the separation vector, and translating means for translating the object so as to displace the object center-of-mass in a translation vector having a translation distance and a translation direction such that the mathematically crossing the translation vector into the separation vector results in a further vector having the vector direction of the rotation vector, the translation distance being such that the object is rotated through the selected angle without substantial counter-rotation of the carrier.

8. The apparatus according to claim 7 wherein the rotating means and the translating means constitute an actuating system for rotating and translating simultaneously such that the carrier remains substantially unrotated during the step of rotating.

9. The apparatus according to claim 8 wherein the actuating system comprises three pairs of linear actuators mounting the object to the carrier, each pair having a common pivotal attachment to the object such that the pivotal attachments are arcuately spaced on the object, the linear actuators of each pair being substantially orthogonal with outer ends pivotally connected to the carrier, with the outer ends of all linear actuators being substantially equidistant from a central axis of the object, and the actuating system further comprises control means for driving the linear actuators cooperatively so as to rotate the object by the selected angle and translate the object by the translation distance.

10. The apparatus according to claim 9 further comprising sensing means for sensing position and orientation of the object relative to the carrier, and responsively providing feedback on the position and the orientation to the control means for effecting the selected angle and the translation distance.

11. The apparatus according to claim 7 wherein the rotationally free system is an unsupported system in a weightless environment.

12. The apparatus according to claim 11 wherein the carrier is a space vehicle.

13. The apparatus according to claim 12 wherein the object is a telescope or an antenna.

14. An apparatus for rotating an object on a carrier, comprising:

an object to be rotated;

carriage means mounted on a carrier for pivotally supporting and moving the object relative to the carrier, wherein the carrier, the carriage means and the object constitute a rotationally free system, the carrier has a mass M and a carrier center-of-mass, the object has a moment of inertia I about an object center-of-mass, the object and the carriage means constitute a subsystem having a mass m and a center-of-mass separated from the carrier center-of-mass by a separation vector having a length L' directed from the carrier center-of-mass to the subsystem center-of-mass, and the subsystem center-of-mass has an initial position on the carrier;

rotating means for rotating the object through a selected angle A about an axis through the object center-of-mass, the selected angle A being defined by a rotation vector with a vector direction substantially perpendicular to the separation vector; and translating means for translating the subsystem simultaneously with rotating so as to displace the subsystem center-of-mass in a translation vector having a translation distance D from the initial position and a translation direction such that mathematically crossing the translation vector into the separation vector results in a further vector having the vector direction of the rotation vector, the translation distance D being determined according to the formula $D = A*I*\{1/M + 1/m\}/L$, where L is a component length of L' in a direction perpendicular to the translation vector, whereby the object is rotated through the selected angle without a substantial counter-rotation of the carrier.

* * * * *